2 Sheets—Sheet 1.

HARDER, DOUGLASS, BECKER & ANTHONY.

Thrashing Machine.

No. 3551

Reissued July 13, 1869

Witnesses
Geo. B. Fowler
J. Smith

Inventors
Manuel Harder
Geo. W. Douglass
Hiram Becker
Daniel Anthony

N. PETERS, Photo-Lithographer, Washington, D. C.

2 Sheets—Sheet 2.
HARDER, DOUGLASS, BECKER & ANTHONY.
Thrashing Machine.
No. 3,551. Reissued July 13, 1869.
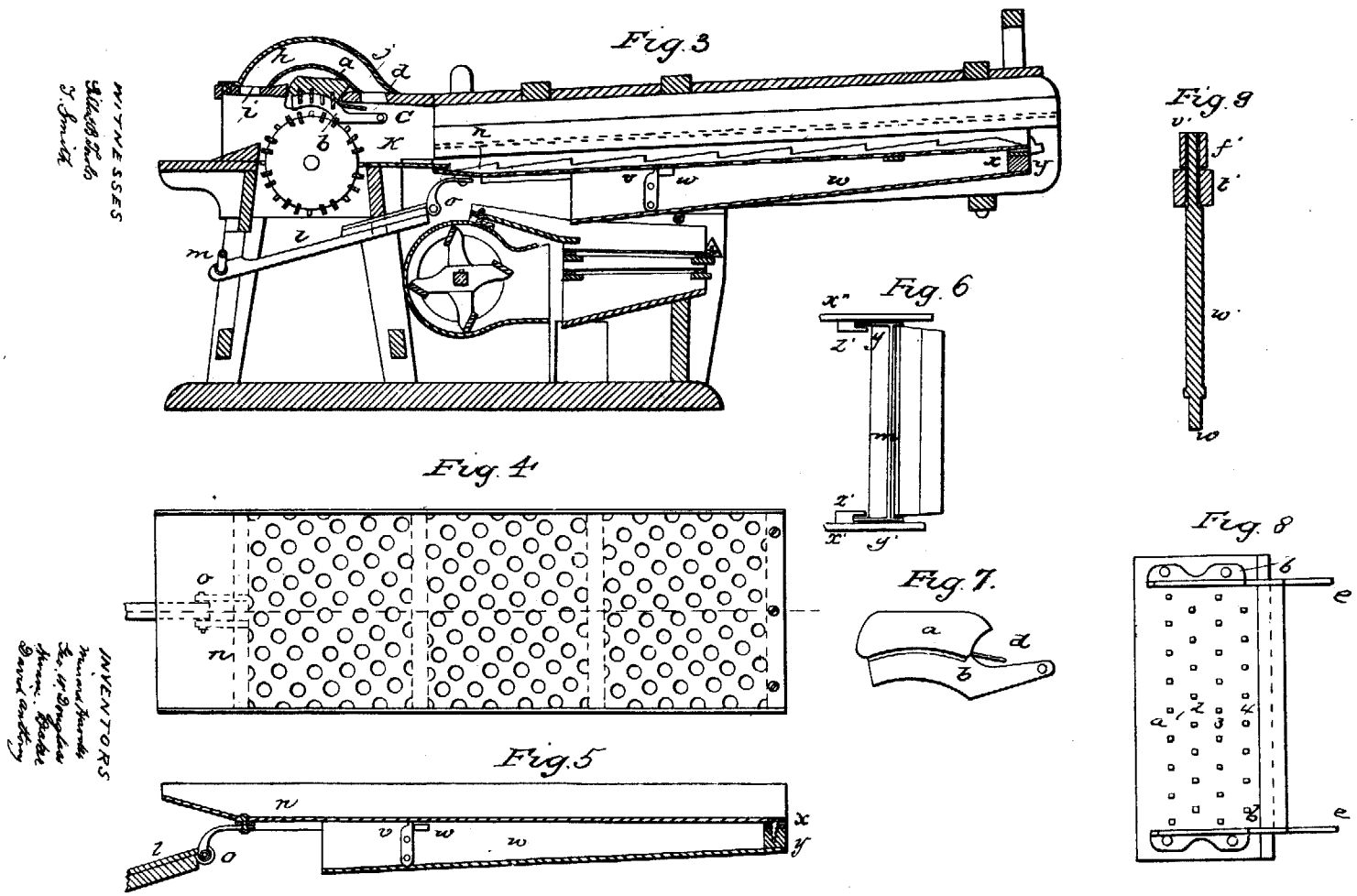
WITNESSES
Gilbert B. Thole
T. Smith
INVENTORS
Minard Harder
Geo. W. Douglass
Hiram Becker
David Anthony
N. PETERS, Photo-Lithographer, Washington, D. C.

UNITED STATES PATENT OFFICE.

REUBEN HARDER AND MINARD HARDER, OF COBLESKILL, NEW YORK, ASSIGNEES OF MINARD HARDER, GEORGE W. DOUGLASS, HIRAM BECKER, AND DAVID ANTHONY.

IMPROVEMENT IN THRASHING-MACHINES.

Specification forming part of Letters Patent No. 38,862, dated June 9, 1863; Reissue No. 3,551, dated July 13, 1869.

DIVISION B.

*To all whom it may concern:*

Be it known that MINARD HARDER, G. W. DOUGLASS, H. BECKER, of Cobleskill, in the county of Schoharie, and D. ANTHONY, of Worcester, Otsego county, all of the State of New York, did invent certain new and useful Improvements in Thrashing-Machines; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use their invention, we will proceed to describe it.

The invention relates to thrashing-machines, and the invention consists in providing and arranging a flue for conveying the dust from the front to the rear side of the thrashing-cylinder, and thereby prevent the dust from escaping at the front of the machine, as hereinafter explained.

Figure 1:
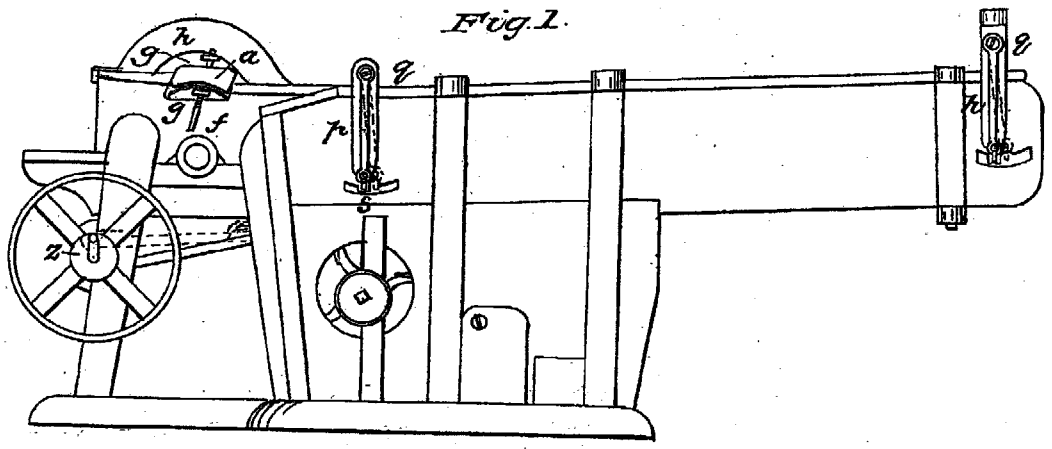
Figure 2:
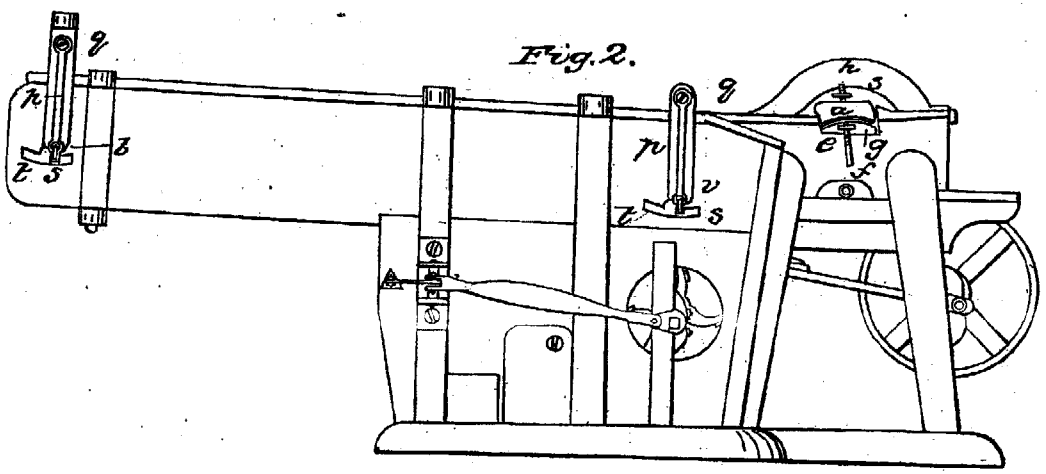

Figure 1 is a side elevation, and Fig. 2 is a similar view from the opposite side. Fig. 3 is a longitudinal vertical section of the machine, the remaining figures representing other and separate features of our invention, which said features form the subject of another application, and need not, therefore, be herein further described.

In thrashing grain, more or less dust is generated, which flows out at the front of the ordinary thrashing-machine, rendering it extremely unpleasant as well as injurious to those who are obliged to occupy a position near the machine, especially the person feeding it, and when the grain is affected by rust or smut this evil is greatly augmented. It is to obviate or prevent this evil that the invention is designed; and to accomplish this we construct the machine with a flue or passage for conveying the dust from the front to the rear of the cylinder, and by thus conveying it out through the rear or discharge end of the machine its escape is prevented at the front.

In Fig. 3 we have represented it as a separate flue, *a* being the concave, which in this case is placed above the cylinder, thus forming what is termed an "over-shot thrasher." An opening, *i*, is formed in the case in front of the concave, which opening extends entirely across the case, or nearly so, and a similar opening, *j*, is made in the case in rear of the concave. A duct or flue, *h*, extends from the front opening, *i*, over the concave to the rear opening, *j*, as shown clearly in Fig. 3. In this case the space between the openings *i* and *j* on each side of the concave *a* is closed, so that the current of air generated by the revolution of the cylinder is forced through the flue *h*, and for the purpose of creating a suction at the opening *j*, and thereby causing a stronger draft or passage of air through the flue *h*, we extend from the rear edge of the concave a guide or deflecting board, *d*, as represented in Fig. 3. When thus constructed, it will readily be seen that the dust which would otherwise escape at the mouth of the machine will be drawn through the opening *i* into and through the flue *h*, and will escape thence through the opening *j*, on the rear side of the cylinder, and thence will pass out at the rear or discharge end of the machine.

Having thus described the said invention, what we claim is—

1. In a thrashing-machine, a dust flue or passage leading from the front to the rear of the cylinder, and so arranged that the rotation of the cylinder will generate or produce a current of air through said flue, substantially as described.

2. The combination of the deflector *d* with the air-passage *h*, when arranged to operate substantially as described.

REUBEN HARDER.
MINARD HARDER.

Witnesses:
CHAS. H. SHAVER,
J. J. DICKINSON.